UNITED STATES PATENT OFFICE.

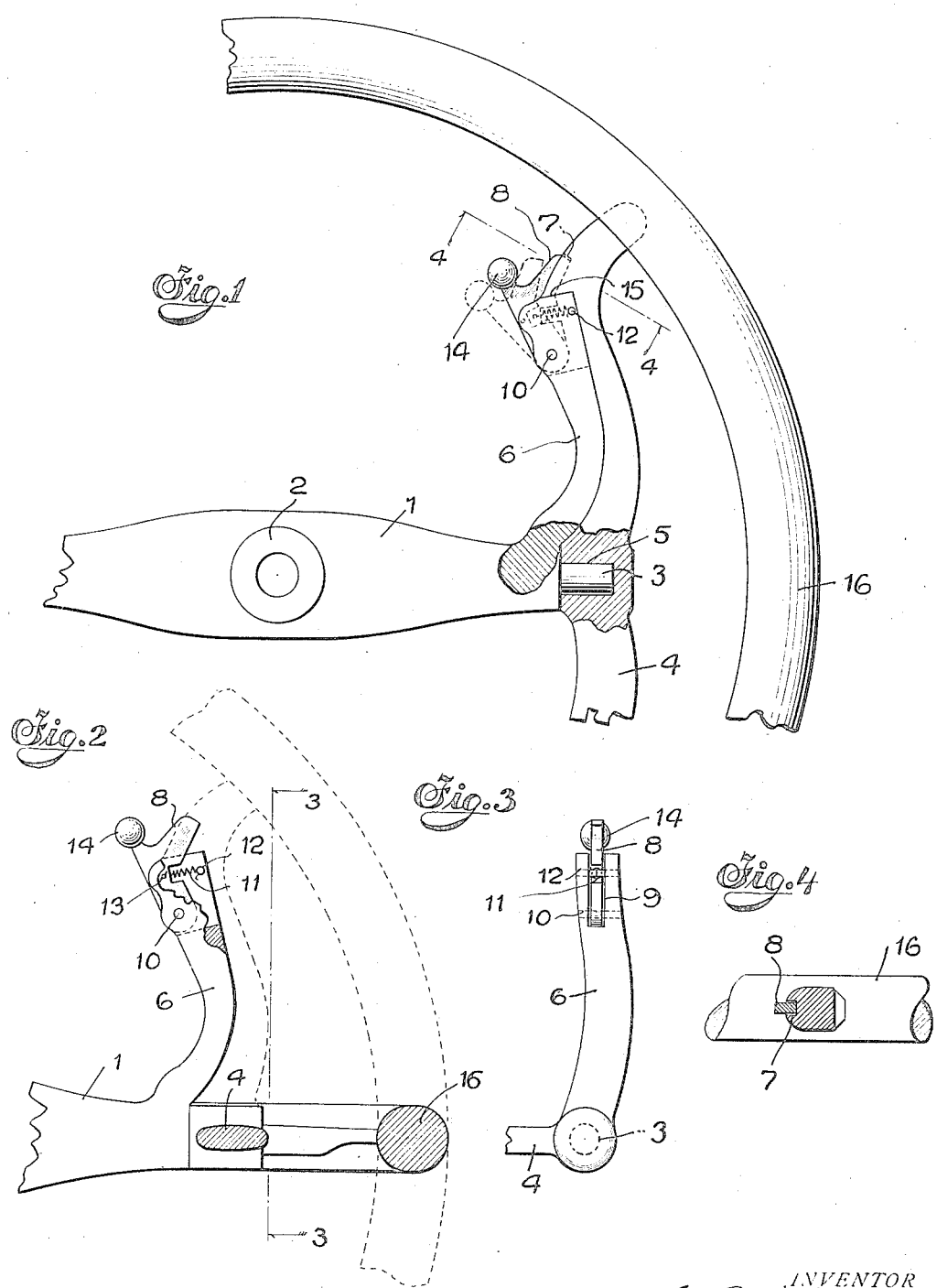

GRANT E. SMITH, OF POUGHKEEPSIE, NEW YORK, ASSIGNOR TO POUVAILSMITH CORPORATION, OF POUGHKEEPSIE, NEW YORK, A CORPORATION OF NEW YORK.

STEERING-WHEEL.

1,377,734.      Specification of Letters Patent.      Patented May 10, 1921.

Application filed January 22, 1919. Serial No. 272,455.

*To all whom it may concern:*

Be it known that I, GRANT E. SMITH, a citizen of the United States, residing in Poughkeepsie, county of Dutchess, State of New York, have invented an Improvement in Steering-Wheels, of which the following is a specification.

The present invention relates to an improvement in steering wheels, one object being to provide a wheel which may be rotated or tilted and which has at the same time ample strength to withstand the forces operating under normal conditions to destroy its rigidity. A further object of the invention is to provide a tiltable wheel which may readily be moved from operative to inoperative position, and vice versa, by relatively simple operations. Another object of the invention is to provide a tiltable steering wheel with reinforcing and locking means which, when applied to a portion of the wheel, may permit said portion to resemble substantially a corresponding portion for the sake of maintaining the essential symmetry of the design of said portions.

One embodiment of my invention is illustrated in the drawings forming a part of the present specification and in which, Figure 1 is a plan view of a portion of a steering wheel with parts broken away to disclose the trunnion and bearing connection between movable parts thereof, Fig. 2 a fragmentary view illustrating the relative position of the rim to the lock carrying arm when the parts of the wheel are in inoperative relation, the normal operative position of the rim with respect to the lock carrying rim being indicated in dotted lines, Fig. 3 a detail view on the line 3—3 of Fig. 2, and, Fig. 4 a fragmentary sectional view on the line 4—4 of Fig. 1 and shows a portion of the latch in locking engagement with a corresponding recess in the rim supporting member of the spider arm.

Referring to the drawings, a metallic frame commonly known as a spider constitutes the support for a steering wheel rim. In the present case, the spider may conveniently include a central transverse member 1 having a hub 2 adapted to receive the steering post of the vehicle to which the wheel is intended to be applied. At opposite ends of transverse member 1 are trunnions 3 upon which rim supporting members 4 of the spider are rotatably mounted said members having recessed bearings 5 adapted to receive the trunnions 3.

The central transverse member may have an armlike extension preferably formed integrally with said transverse member and positioned in such a manner that its central longitudinal axis may lie in the plane coinciding with or substantially parallel to the plane of the rim when the latter is in normal operative steering position.

As indicated in the drawings, suitable means may be provided for detachably connecting or locking said arm 6 to a portion of the spider or to another tiltable portion of the wheel. For this purpose, I have shown one of the rim supporting members 4 provided with a shoulder 15 having a longitudinally disposed slot 7 which is adapted to receive a latch 8, pivotally mounted on the arm 6 in such a manner that said latch will engage the slot 7 to securely lock the arm to the rim support. The rim supporting member may be recessed at one side between the shoulder 15 and the bearing 5 to accommodate the arm 6, thus giving said arm and said supporting member substantially the appearance of a continuous element when the parts are in locked position.

As illustrated more clearly in Figs. 2 and 3, the arm 6 may be provided with a slot 9 adapted to receive the latch 8, said latch being pivotally mounted in said slot upon a shaft 10. To retain the latch 8 in operative engagement with recess 7, spring means are provided in the shape of a coiled spring 11 having one end fixed to the arm 6 by means of a pin 12 and the other end attached to the latch 8 by any suitable means shown herein as a relatively small hole 13 adapted to receive the hook shaped portion of said spring. For convenience in disengaging the latch 8 from the recess 7, a suitable handle may be provided such as ball shaped knob 14 positioned near the rim 16 on the steering wheel.

In operation, when the rim and transverse bar 1 are in the relative positions shown in Fig. 1, the operator may raise the latch 8 as indicated in dotted lines, thus releasing said latch from engagement with the recess 7, whereupon the rim may be rotated or tilted to inoperative position. The operator then has a clear path past the steering wheel of the vehicle and may dismount or turn around in his seat without interference from the wheel. To resume operative steering position, the operator simply tilts the rim back to such a position that latch 8 may reëngage the recess 7. By positioning the locking means adjacent to the rim and at a substantial distance from the trunnions 3, there is relatively little leverage at the point of locking contact, thus producing the minimum of strain upon the material of the latch. Furthermore, when the arm 6 projects radially with respect to the longitudinal axis of the transverse member 1, said arm may conveniently be formed in such a manner that it will conform substantially to the design of the rim supporting member 4 when in operative engagement with said member.

I claim as my invention:

1. A steering wheel comprising a spider having a central transverse member, a rim, members for supporting said rim, and means for locking together the transverse member and one of said members at a point remote from the longitudinal axis of said transverse member.

2. In a steering wheel the combination of a rim, supporting members attached thereto, a transverse member having said supporting members pivotally mounted thereon, an arm integral with said transverse member and extending to contact with a part of one of said supporting members, and means for locking said arm and said supporting member positioned between said pivot and said rim.

3. A steering wheel comprising a spider having a central transverse member and a rim supporting member rotatable with respect thereto, means projecting from the central transverse member and coöperating with the rim supporting member adjacent to a rim engaging portion thereof to lock said members together.

4. A steering wheel comprising a spider having a central transverse member and a rim supporting member rotatable with respect thereto, and means extending from said transverse member, normal to the longitudinal axis thereof and substantially in a plane including said rim and adapted to coöperate with the rim supporting member to hold said members in locked engagement.

5. A steering wheel comprising a spider having a central transverse member and a rim supporting member rotatable with respect thereto and means for locking said members together including a latch carrying member integral with and extending from the transverse member and latch receiving means on the rim supporting member.

6. A steering wheel comprising a spider having a central transverse member and a rim supporting member rotatable with respect to said transverse member, an arm on the transverse member, and means adapted to lock said arm to said rim supporting member in operative steering relation.

7. A steering wheel comprising a spider having a central transverse member and a rim supporting member rotatable with respect to said transverse member, an arm extending from said transverse member and substantially normal to the longitudinal axis thereof, and means mounted on said arm to detachably lock the same to the rim supporting member.

8. A steering wheel comprising a spider having a central transverse member and a rim supporting member rotatable with respect to said transverse member, an arm extending from said transverse member and substantially normal to the longitudinal axis thereof, and spring actuated means on said arm to lock the same to the rim supporting member.

9. A steering wheel comprising a spider having a central transverse member and a rim supporting member rotatable with respect to said transverse member, an arm extending from said transverse member and substantially normal to the longitudinal axis thereof and means at the free end of said arm to lock the same to the rim supporting member.

10. In a steering wheel the combination of a rim, supporting members attached to said rim, a transverse member having said supporting members pivotally mounted thereon and having an arm integral therewith and adapted to fit a cut-away portion in one of said supporting members, and a biased catch on said arm adapted to engage said supporting member.

11. In a steering wheel the combination of a rim, supporting members received by said rim, a transverse member adapted to pivotally receive said supporting members, an arm extending from said transverse member and adapted to fit a cut-away portion in said supporting member the shape and size of said arm and said supporting member in normal position being substantially the same as the part of said supporting member on the other side of said pivot, and means for locking said arm and said supporting member in normal position.

12. A steering wheel comprising a rim, supporting members attached thereto, a transverse member connected with said supporting members and adapted to be mounted on a steering post, and a locking means associated with one of said supporting members and with said transverse member to lock said supporting member and said transverse member together at a point between the transverse member and said rim.

13. A steering wheel comprising a rim, supporting members attached thereto, a transverse member pivotally associated with said supporting members, and a locking means contacting with one of said supporting members and with an extended part of said transverse member to lock together said supporting member and said transverse member at a point on said supporting member other than at said pivotal connection and at the juncture of said supporting member with said rim.

In testimony whereof, I have signed my name to this specification this 20th day of January, 1919.

GRANT E. SMITH.